United States Patent
Ehlert et al.

(10) Patent No.: US 10,943,079 B2
(45) Date of Patent: Mar. 9, 2021

(54) DEVICE FOR IMPLEMENTING A DETECTION FUNCTION AND METHOD FOR OPERATING SUCH A DEVICE

(71) Applicant: Robert Bosch GmbH, Stuttgart (DE)

(72) Inventors: Alexander Ehlert, Reutlingen (DE); Simon Lieb, Reutlingen (DE); Felix Schmidt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/633,616

(22) PCT Filed: Jul. 23, 2018

(86) PCT No.: PCT/EP2018/069911
§ 371 (c)(1),
(2) Date: Jan. 24, 2020

(87) PCT Pub. No.: WO2019/020563
PCT Pub. Date: Jan. 31, 2019

(65) Prior Publication Data
US 2020/0210662 A1   Jul. 2, 2020

(30) Foreign Application Priority Data
Jul. 27, 2017   (DE) .................... 10 2017 212 920.4

(51) Int. Cl.
*G06K 7/10* (2006.01)

(52) U.S. Cl.
CPC ..... *G06K 7/10831* (2013.01); *G06K 7/10584* (2013.01); *G06K 7/10851* (2013.01)

(58) Field of Classification Search
CPC ...... G01B 7/00455; G01B 7/013; G01B 7/09; G01B 7/24–85
(Continued)

(56) References Cited

U.S. PATENT DOCUMENTS

| 4,809,014 A | * | 2/1989 | Kempter | ............... | B23K 26/042 |
| | | | | | 347/248 |
| 6,320,839 B1 | * | 11/2001 | Tobita | ................ | G11B 7/00718 |
| | | | | | 369/116 |

(Continued)

FOREIGN PATENT DOCUMENTS

| EP | 1916617 A1 | 4/2008 |
| WO | 2012059333 A2 | 5/2012 |
| WO | 2015185247 A1 | 12/2015 |

OTHER PUBLICATIONS

International Search Report for PCT/EP2018/069911; dated Oct. 31, 2018.

*Primary Examiner* — Daniel St Cyr
(74) *Attorney, Agent, or Firm* — Norton Rose Fulbright US LLP; Gerard Messina

(57) ABSTRACT

A detection device, which includes a scanning module, a detection module operated at a distance from the scanning module, and an evaluation unit. The scanning module includes a laser light source for generating a laser beam, a deflection unit to deflect the beam, and a control unit for controlling the laser light source and the deflection unit, so that the beam is moved in a scanning pattern. The detection module includes a light detector, with which the light of the beam reflected on an object in the beam path is detected and converted into a received signal. The first laser light source is controlled so that the beam is modulated as a function of its deflection and in this way is provided with synchronization marks. The evaluation unit identifies these synchronization marks in the received signal and synchronizes the received signal with the deflection of the beam based on them.

20 Claims, 4 Drawing Sheets

(58) Field of Classification Search
USPC .............................. 235/454, 462.09, 462.1
See application file for complete search history.

(56) References Cited

U.S. PATENT DOCUMENTS

| | | | | |
|---|---|---|---|---|
| 6,721,240 | B2 * | 4/2004 | Yamada | G11B 7/261 |
| | | | | 369/116 |
| 7,242,494 | B2 * | 7/2007 | Hanazato | B41J 11/46 |
| | | | | 358/1.15 |
| 8,550,348 | B2 * | 10/2013 | Droemer | G06K 7/10702 |
| | | | | 235/454 |
| 2002/0153422 | A1 * | 10/2002 | Tsikos | G06K 7/10742 |
| | | | | 235/454 |
| 2004/0125195 | A1 * | 7/2004 | Satoh | G02B 26/123 |
| | | | | 347/234 |
| 2007/0272841 | A1 | 11/2007 | Wiklof | |
| 2017/0180703 | A1 | 6/2017 | Kovacovsky et al. | |

* cited by examiner

DEVICE FOR IMPLEMENTING A DETECTION FUNCTION AND METHOD FOR OPERATING SUCH A DEVICE

FIELD

The present invention relates to a device for implementing a detection function as well as a method for operating such a device. An example device in accordance with the present invention includes at least one scanning module, one detection module and one evaluation unit, the detection module being operable at a physical distance from the scanning module. The scanning module includes at least one first laser light source for generating at least one detection laser beam, a deflection unit for the at least one detection laser beam and a control unit for controlling the at least one first laser light source and the deflection unit in such a way that the at least one detection laser beam is moved in a predefined scanning pattern. The detection module includes at least one light detector, with which the light of the at least one detection laser beam reflected on an object in the beam path is detectable and is convertible into a received signal.

An example detection function of the present invention may be utilized for a variety of applications, for example, for reading a bar code or also for identifying other defined visual features of an object in the scanning area. Another important field of application is the implementation of interactivity functions, i.e., the detection of objects and, if necessary, also their movements in the beam path of the detection laser beam, for example, in conjunction with a gesture recognition.

BACKGROUND INFORMATION

A scanning laser projector including an interactivity function, which is made up of a projector module for generating images and an interactivity module, is described in PCT Application No. WO 2015/185247. These two modules may be operated offset, i.e., at a physical distance from one another.

The projector module in this case functions as a scanning module within the meaning of the present invention by including laser light sources for generating images and for the interactivity function, as well as a deflection unit for the laser beams generated by the laser light sources. The projector module further includes a control unit for controlling the laser light sources and the deflection unit in accordance with the image information to be projected. The interactivity function is implemented in this case using an infrared laser, whereas laser sources in the visible spectrum are utilized for generating images. The infrared laser beam, which in this case functions as a detection laser beam, is moved together with the laser beams for generating images in a predefined scanning pattern over an image surface.

The interactivity module of the laser projector described in PCT Application No. WO 2015/185247 A1 functions as a detection module within the context of the present invention. It includes a photodiode as a light detector, which converts the reflected infrared laser light into a photocurrent as a received signal. By evaluating this received signal, it is possible to ascertain whether an object is located in the beam path of the infrared laser. If the received signal is synchronized with the scanning process of the scanning module, it is also possible to locate such a detected object in the scanning pattern, since a reliable assignment of the received signal to a defined position in the scanning pattern is then possible. A prerequisite for the synchronization is a preferably exact knowledge of the scanning process, in particular, of the transmit clocking and of the scanning pattern. Since the transmit clocking is also significantly determined by the mechanical properties of the deflection unit, it is subject to certain fluctuations, which are attributable mainly to environmental influences, such as temperature fluctuations, humidity fluctuations and pressure fluctuations. Hence, during ongoing operation, the received signal must always be continually resynchronized with the transmit signal, i.e., with the detection laser beam. However, the transmit clocking changes only comparatively slowly and minimally so that it is sufficient for most applications to repeat this synchronization at regular time intervals. In the time intervals between the synchronization processes, it is possible to assign the received signal to the transmit signal and thus to the corresponding position in the scanning pattern simply by counting the transmit clockings. If the scanning process takes place, for example, frame by frame in lines or in columns having a defined number of pixels and if both the frame rate as well as the line frequency or column frequency and number of pixels per line or column are known, it is then possible to ascertain the frame starts and line starts of the scanning process between the individual synchronization processes by counting the transmit clockings and to assign them to the received signal.

In PCT Application No. WO 2015/185247 A1, it is provided to perform the synchronization with the aid of a vertical and a horizontal synchronization data signal. These synchronization data signals are generated separately during the projection process and transmitted via a communication interface provided specifically for such purpose to the interactivity module.

In practice, the projector module or scanning module and the interactivity module or detection module are connected for such purpose via a cable. Such a cable connection significantly limits the potential uses of the convention device.

SUMMARY

Measures are provided with the present invention, which allow for a reliable synchronization of the scanning process of a scanning module and of the received signal of a detection module of a device of the type in question, so that the scanning module and the detection module may be operated spatially separated from one another, i.e., remotely.

This is achieved according to the present invention in that the first laser light source for the detection laser beam is controllable in such a way that the detection laser beam is modulated as a function of its deflection and in this way is provided with synchronization marks, and in that the evaluation unit is designed to identify these synchronization marks in the received signal and to synchronize the received signal with the deflection of the detection laser beam on the basis of these synchronization marks.

Accordingly, the synchronization according to the present invention is based on a modulation of the detection laser beam, i.e., of the laser light source for the detection function. The detection laser beam itself is provided in this case with synchronization marks so that the synchronization marks, together with the laser light are transmitted from the scanning module to the detection module. Thus, additional synchronization data signals, as they are described in the related art, are not required here, nor any separate data transmission lines or communication interfaces. Instead, the synchronization method according to the present invention utilizes the hardware already available. This simplifies the structure of the device according to the present invention, in particular, during remote operation, and is also cost-effective.

In the context of the present invention, a detection laser beam of arbitrary wavelength may, generally, be used as long as the light detector of the detection module is attuned to it. The use of a laser light source in the non-visible range has proven advantageous for numerous applications such as, for example, in the area of interactivity, for reasons of safety the infrared range being preferred here.

Although the use of the measures for synchronizing a scanning module and a detection module described here is not limited to particular applications or potential uses of the device according to the present invention, these measures may be of particular importance for mobile applications. In this context, it has proven advantageous if both the scanning device, as well as the detection device, are small and light. The use of a micro-mirror assembly as a deflection unit contributes significantly to the miniaturization of the scanning device. This may, for example, be a two-dimensional movable micro-mirror or two one-dimensional movable micro-mirrors. These are particularly suited for implementing a line-by-line or column-by-column scanning movement of the detection laser beam.

As explained above, the measures according to the present invention allow not only for the detection of an object in the beam path of the detection laser beam, but also for such a detection event to be located in the scanning pattern on the basis of the received signal. In one advantageous refinement of the device according to the present invention, the device is utilized for implementing an interactivity function by further designing the evaluation unit to generate a predefined detection control signal based on the identified detection event in combination with the location thereof in the scanning pattern. This means, different detection control signals may be generated, which in turn are able to trigger different actions, depending on at which position in the scanning pattern of the detection laser beam an object is detected. In this way, it is possible, for example, to control the device itself and, in particular, the scanning module. In this case, at least one data channel must be provided for transmitting detection control signals between the detection module and the scanning module. However, the control of additional devices via a host system is, for example, also possible. In this case, a corresponding data channel would have to be available between the detection module and the host system. Such a data channel could, for example, be implemented in the form of a radio connection or could also be cable-based.

In one refinement of the present invention, the example device is assigned a projection unit, with which pieces of image information are projectable onto an image surface at least in one area of the scanning pattern. With the aid of the detection function implemented according to the present invention, it is thus possible, for example, to also execute more complex input instructions by an object, such as a hand, capable of being located at different defined positions of the projected user interface. An arbitrary projection unit may, in principle, be used in this case, i.e., an arbitrary method for projecting images may be utilized.

However, a scanning laser projection unit has proven particularly advantageous in connection with the device according to the present invention. In this specific embodiment, the detection laser beam generated by the first laser light source could also be utilized for projecting pieces of image information, if the first laser light source is modulatable not only for synchronization purposes, but also in accordance with the pieces of image information to be projected. In this case, the detection laser beam could be used in a defined line or defined column of a frame for transmitting synchronization marks, whereas it could be utilized in the remaining lines or columns for projecting pieces of image information. In one variant of this specific embodiment of the present invention, the scanning module includes at least one second laser light source for generating at least one projection laser beam for projecting pieces of image information. This at least one second laser light source is therefore controlled in accordance with the pieces of image information to be projected, in order to modulate the projection laser beam accordingly. The projection laser beam in this case is moved with the aid of the deflection unit together with the detection laser beam in a predefined scanning pattern. In this variant, the detection laser beam may be used either exclusively for detection purposes or additionally also for projecting pieces of image information when operating in the visible wavelength range.

As described above, the detection laser beam is modulated as a function of its deflection and in this way is provided with synchronization marks. The detection laser beam is therefore modulated as a function of its position in the scanning pattern.

In a scanning image projection, the pieces of image information are generally projected sequentially in the form of pixels. In a very frequently used scanning pattern, a predetermined number of pixels forms in each case an image line or image column, a predetermined number of image lines or image columns form a frame and a sequence of frames forms an image sequence. If the scanning module of the device according to the present invention is equipped with such a projection unit and both the projection laser beams as well as the detection laser beam are deflected simultaneously with the aid of the same deflection unit, then it has proven advantageous if the detection laser beam is modulated as a function of a piece of meta-image information, which relates to the instantaneously projected frame and/or to the instantaneously projected image line or image column and/or to the instantaneously projected pixels. Pieces of meta-image information refer, for example, to frame numbers within an image sequence or also to line numbers or column numbers within a frame or also to defined positions within a line or column. Thus, the modulation of the detection laser beam according to the present invention may, for example, take place in each case simultaneously with the projection of at least one predefined image line or image column of at least one predetermined frame of an image sequence.

The synchronization marks should be signal shapes clearly identifiably as impressed. For this purpose, the detection laser beam may be modulated simply with a predefined signal pattern, in particular, as a square wave signal having a predetermined fixed frequency or having a frequency, which is a function of the deflection of the detection laser beam. At this point, it is noted that the detection laser beam may also be impressed with additional pieces of information via a corresponding modulation such as, for example, the frame number.

BRIEF DESCRIPTION OF THE DRAWINGS

As discussed above, there are various possibilities for advantageously developing and refining the teaching of the present invention. For this purpose, reference is made, on the one hand, to the following description of exemplary embodiments of the present invention with reference to the figures.

DETAILED DESCRIPTION OF EXAMPLE EMBODIMENTS

Figure 1:
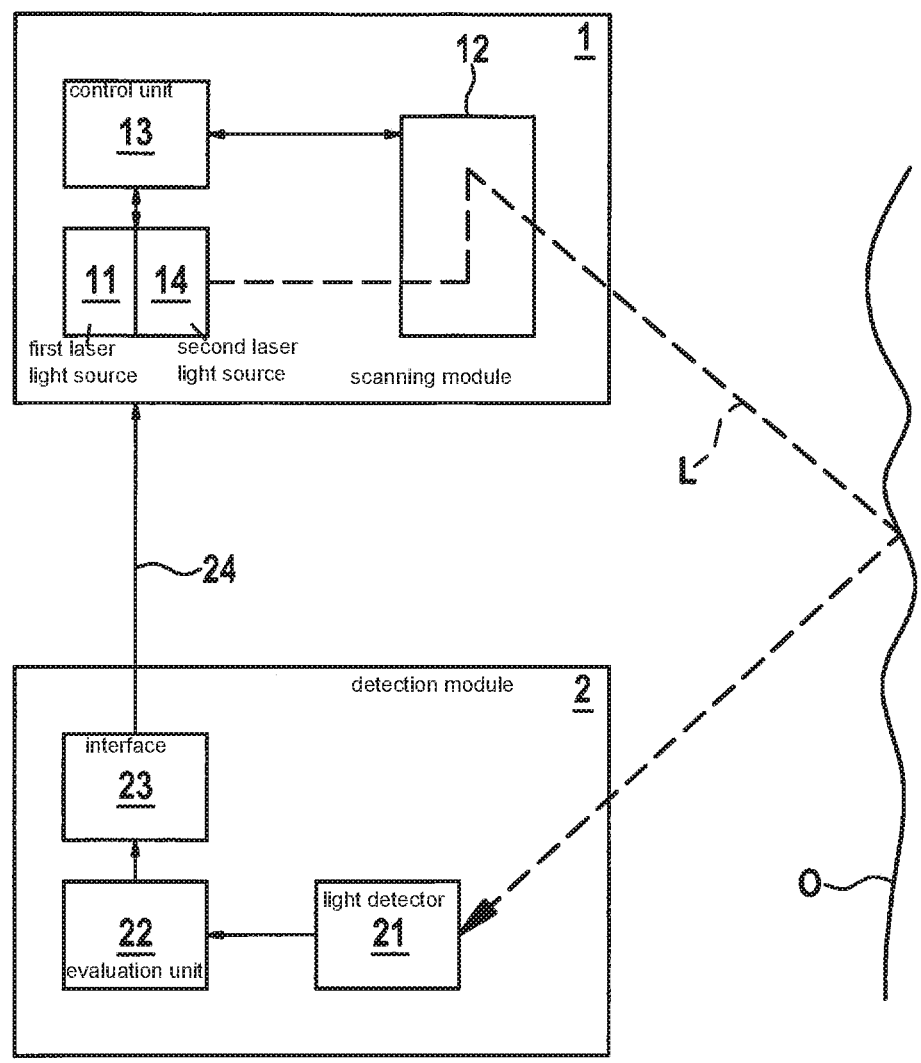
FIG. 1 schematically shows a block diagram of a device S for implementing a detection function according to one specific embodiment of the present invention.

Device S for implementing a detection function schematically depicted in FIG. 1 includes a scanning module 1, a detection module 2 and an evaluation unit 22 which, in this case, is a component of detection module 2. Detection module 2 is situated at a physical distance from scanning module 1 and is also operable remotely from scanning module 1.

Scanning module 1 is equipped with a first laser light source 11 for generating a detection laser beam L. The laser light source may be a laser light source in the visible wavelength range or also a laser light source in a non-visible wavelength range such as, for example, an infrared laser, depending on the intended purpose. Another component of scanning module 1 is a deflection unit 12 for detection laser beam L. Deflection unit 12 in the exemplary embodiment depicted herein is intended to be a micro-mirror assembly, which is equipped, for example, with two one-dimensional movable micro-mirrors for implementing a line-by-line or column-by-column scanning movement of detection laser beam L. Finally, scanning module 1 also includes a control unit 13 for controlling first laser light source 11 and deflection unit 12, so that the at least one detection laser beam L is movable in a predefined scanning pattern.

An important component of detection module 2 is a light detector 21, with which the light of detection laser beam L reflected on an object O in the beam path is detectable and is convertible into a received signal. Light detector 21 could, for example, include at least one photodiode, which converts the incident light into a photocurrent as a function of the intensity of the received light. This signal of the photodiode may be easily filtered, amplified, converted from analog to digital, and then evaluated.

According to the present invention, first laser light source 11 for detection laser beam L is controllable with the aid of control unit 13 in such a way that detection laser beam L is modulated as a function of its deflection and in this way is provided with synchronization marks. Since the modulation of detection laser beam L directly impacts the intensity of the light received from light detector 21 and, therefore, of the received signal as well, it is possible to identify the synchronization marks in the received signal. According to the present invention, this identification takes place via evaluation unit 22, which is also designed according to the present invention to synchronize the received signal with the deflection of detection laser beam L on the basis of the synchronization marks. In this way, it is possible in each case to assign the received signal a defined position in the scanning pattern. The synchronization of the received signal and transmit signal is explained in greater detail in conjunction with FIGS. 3 and 4.

In the exemplary embodiment depicted in FIG. 1, detection laser beam L is reflected on a surface O. This may be the surface of a package, for example, which is provided with a bar code or with another visually identifiable feature. In this case, device S according to the present invention may be used to identify the visually identifiable feature. For this purpose, detection laser beam L is guided in a predefined scanning pattern over the visual feature. In the process, the intensity of the reflected light of detection laser beam L varies, since the incident light of detection laser beam L is more or less absorbed depending on the color and nature of surface O. This change of intensity is reflected in the received signal and may be located in the scanning pattern based on the synchronization according to the present invention of the received signal with the deflection of detection laser beam L. In this way, it is possible to also assign the received signal to defined positions on the surface O, which is a prerequisite for the identification of visually identifiable features.

With the aid of device S according to the present invention, however, it is more generally possible to also identify whether an obstacle is located in the beam path of detection laser beam L and at which position such an object is located in relation to the scanning pattern of detection laser beam L. This allows for the implementation of an interactivity function. For this reason, evaluation unit 22 in this case is also designed to identify objects in the beam path of detection laser beam L as a detection event on the basis of the received signal and to locate such a detection event on the basis of the received signal in the scanning pattern of detection laser beam L. A predetermined detection control signal is also generated on the basis of the identified detection event in combination with the location thereof in the scanning pattern. In the exemplary embodiment described herein, this detection control signal is used to control scanning module 1. For this reason, an interface 23 and a data channel 24 for transmitting detection control signals are provided between detection module 2 and scanning module 1. Thus, an object in the beam path of detection laser beam L may, for example, be translated into a control signal, which causes a switch off of scanning module 1. This may involve a deliberately executed user instruction in the form of a gesture in the beam path of detection laser beam L or also an automatic switch-off as an "eye-safety" measure. With the aid of the detection control signals, however, another unit could also be controlled, which is either connected directly to detection module 2 or to evaluation unit 22 or is also linked to detection module 2 via a host system.

To further refine the interactivity function, device S could also be equipped with a projection unit, with which pieces of image information are projectable onto an image surface at least in one area of the scanning pattern of detection laser beam L. In this way, it would be possible, for example, to project a user interface onto the image surface. This could be utilized for inputting differentiated instructions, since it is possible to clearly locate the position of an object such as, for example, the hand of a user, on the projected user interface with the aid of the received signal synchronized according to the present invention.

It is particularly advantageous if the projection unit is implemented in the form of a laser scanner system and the laser light source for the detection laser beam is a component of this laser scanner system. A laser scanner system generally includes multiple laser light sources, which emit light of varying wavelengths in the visible range. These projection laser beams are modulated in accordance with the image information to be projected and guided with the aid of a deflection unit in a predefined scanning pattern over the image surface, where they preferably overlap. The detection laser beam together with the projection laser beams are advantageously deflected with the aid of the same deflection unit. If the laser light source of the detection laser beam also emits light in the visible range and is controllable in accordance with the pieces of image information to be projected, the detection laser beam may also be utilized for projecting pieces of image information. In some applications, however, it may be advantageous if the detection laser beam is not visible, i.e., for example, is in the infrared wavelength range. In this case, the light detector may be blocked against interfering light and diffused light of the projection laser beams simply with the aid of an infrared filter.

As previously indicated, there are a number of potential uses for the device according to the present invention for implementing a detection function, the specific individual application determining the evaluation of the received signal. Accordingly, the detection module also supplies application-specific output data. These could, for example, be pieces of image information of a visual feature or also just touch events. Accordingly, transmission channel 24 must satisfy different requirements. If detection module 1 supplies detection control signals for scanning module 2, as previously described, then it has proven advantageous to utilize a bi-directional, asynchronous data channel as a back channel such as, for example, Bluetooth or ZigBee. Such a data channel may then also be utilized for transmitting metadata, which describe the scanning pattern, such as number of lines, line length, line number, synchronization patterns used, frame rate, etc. The data rate and timing accuracy required for such metadata are comparatively low. The metadata may be used for simplifying the synchronization and for enhancing the interference resistance. It is advantageous to know the exact number of projected lines if, for example, parts of the image area are to be completely covered.

At this point, however, it is once again expressly noted that the synchronization marks themselves are not transmitted via transmission channel 24 from scanning module 1 to detection module 2, but, according to the present invention, are sent to detection module 2 together with the laser light of detection laser beam L emitted by scanning module 1.

At least one second laser light source 14 is optionally also provided for generating at least one projection laser beam for projecting pieces of image information. The projection laser beam in this case is moved together with the detection laser beam in a predefined scanning pattern with the aid of deflection unit 12. The at least one second laser light source 14 in this case is controlled as a function of the pieces of image information to be projected for generating the at least one projection laser beam.

Figure 2:
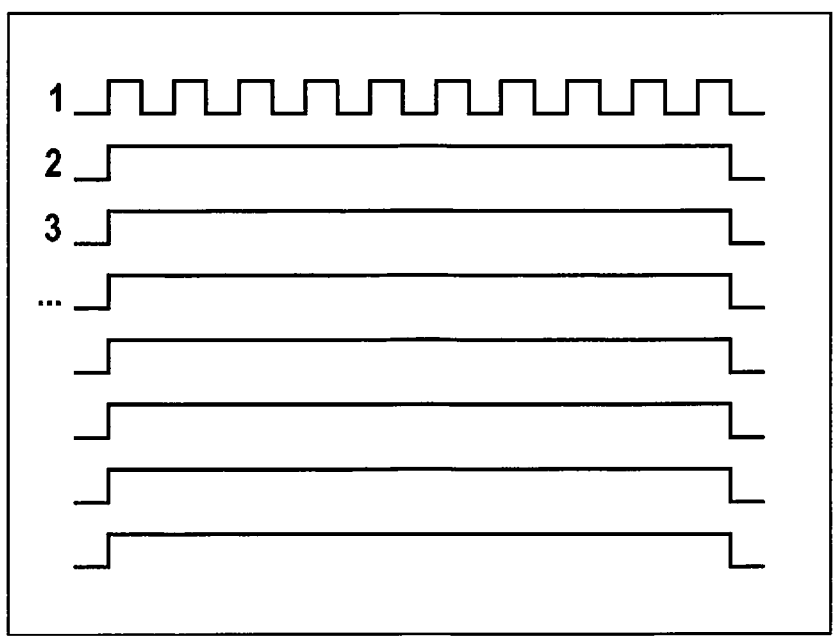
FIG. 2 shows an example of the modulation of the detection laser beam according to the present invention.

FIG. 2 serves to explain the modulation according to the present invention of the detection laser beam for generating synchronization marks, which are transmitted together with the light of the detection laser beam from the scanning module to the detection module of a device according to the present invention. As previously mentioned, the present invention is directed to the movement of the detection laser beam in a predefined known scanning pattern. This may be any scanning pattern such as, for example, a Lissajous curve. If the present invention is implemented in conjunction with a scanning projection of pieces of image information, then the scanning movement of the detection laser beam takes place together with the projection laser beams frequently line-by-line or column-by-column in frames. The pieces of image information are then projected sequentially in the form of pixels, in each case a predetermined number of pixels forming an image line or image column, a predetermined number of image lines and image columns forming a frame and a sequence of frames forming an image sequence. In this case, the detection laser beam is advantageously modulated as a function of a piece of meta-image information, which relates to the instantaneously projected frame and/or to the instantaneously projected image line and image column and/or to the instantaneously projected pixels. This is illustrated by FIG. 2, where the amplitude profile of the light intensity of the detection laser beam for the individual scanning lines of such a frame-by-frame scanning movement is depicted. In the case described herein, the scanning movement is intended to run from top to bottom and the synchronization is to take place frame-by-frame. For this purpose, the detection laser beam is provided here in each case in the first line of a frame with a square wave signal of a fixed predefined modulation frequency, which is based on the clock frequency of the deflection unit and corresponds to the pixel frequency of the simultaneously projected image frame. Another synchronization pattern may, however, be just as easily utilized such as, for example, a sawtooth signal. In some cases therefore, it may also be meaningful to utilize a variable modulation frequency, for example, if the synchronization is to take place in stages, initially coarse, then becoming increasingly finer. In the present case, the first line, i.e., a margin, is provided with synchronization marks. An arbitrary other image line may, in principle, also be utilized for the synchronization, however. In each case, both pieces of information about the scanning pattern, i.e., in this case, the number of pixels per line, the number of lines per frame and the clock frequency of the scanning module, as well as pieces of information about the type of the synchronization marks and their "arrangement," i.e., in this case, the modulation signal shape and modulation frequency, must be available to the evaluation unit for the synchronization, so that the synchronization marks thus generated may be identified in the received signal and assigned to the corresponding positions in the scanning pattern. Beginning from the second line, the intensity of the detection laser beam in this case is raised each time at the beginning of the line from a base level to an elevated level in order to be lowered to the base level again at the end of the line. This modulation may also be identified in the received signal and be used for the synchronization.

At this point, it is also noted that the detection laser beam emitted by the scanning module as well as the received signal received by the detection module may be considered to be a classic serial data stream. Accordingly, the synchronization methods and synchronization patterns used in serial data transmission may also be utilized.

The modulation frequency, meaningfully used for generating the synchronization marks, is selected as a function of the reception characteristics, i.e., of the characteristics of the light detector and of the downstream signal processing and evaluation unit. Bandwidth and pass frequency, in particular, should be considered in this case.

In the case of scanning laser projectors, the pixel clock is usually significantly higher, for example, in the range of 85 MHz, than the bandwidth of the receiver circuit of the detection module, which is usually merely in the range of 100 kHz to 7 MHz. The significantly higher transmission frequency of the scanning module allows for a very fine modulation of the detection laser beam in this case.

Figure 3:
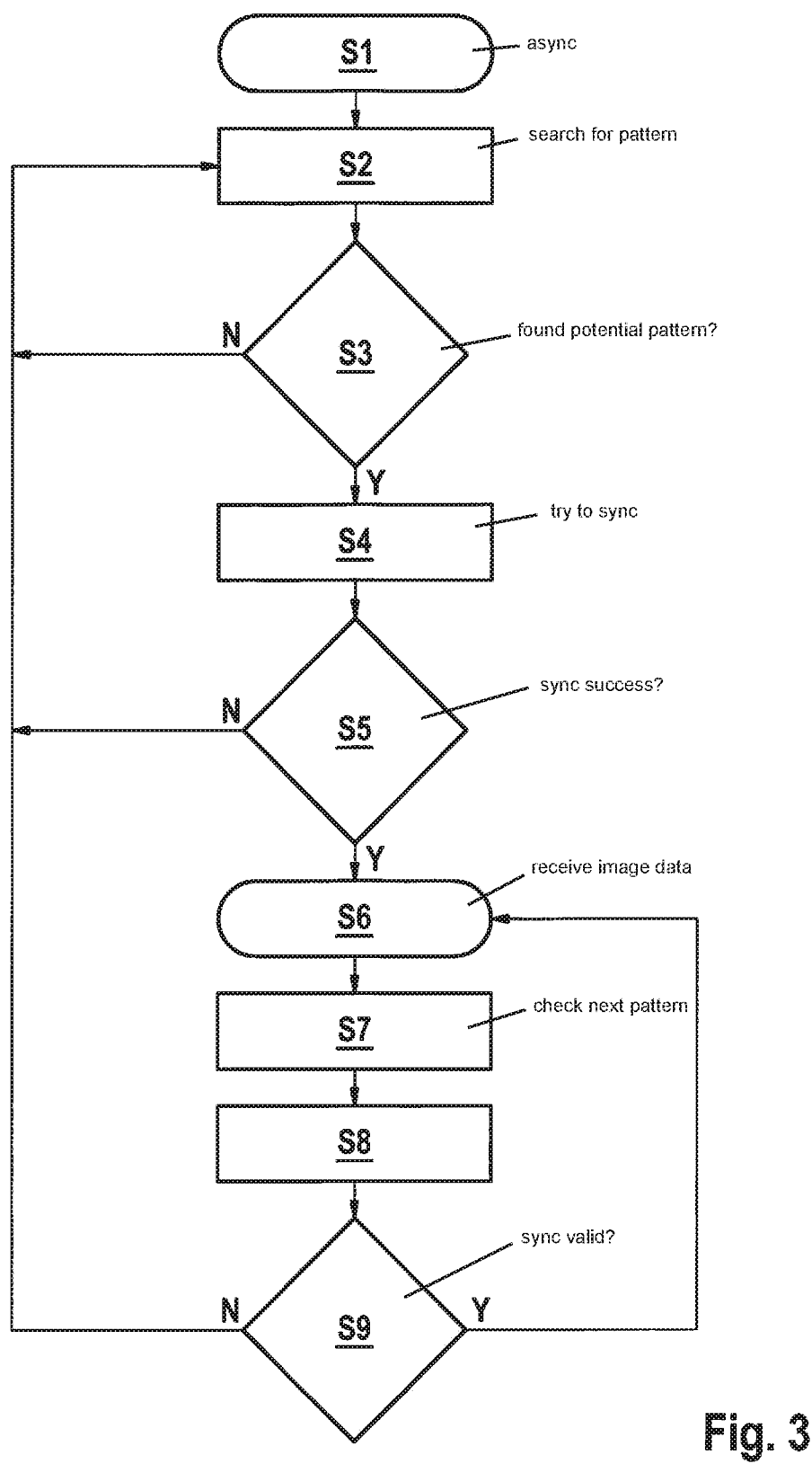
FIG. 3 shows a flow chart for the synchronization according to the present invention of the received signal with the transmit signal and with the deflection of the detection laser beam.

The method according to the present invention for synchronizing the received signal with the deflection or scanning movement of the detection laser beam is explained below with reference to the flow chart of FIG. 3. In initial situation S1, the digitized received signal is not synchronized—"async"—with the scanning movement of the detection laser beam. In step S2 the received signal is processed and evaluated with the aim of identifying particular signal patterns, which are known to the detection module as synchronization marks—"search for pattern". This signal evaluation is performed until a corresponding signal pattern has been identified, which is queried in step S3—"found potential pattern?". As explained in conjunction with FIG. 2, it is possible to both identify the first frame line and to ascertain the instantaneous clock frequency of the detection laser beam based on the synchronization marks. The synchronization in S4 is based on this instantaneous clock frequency—"try to sync"—, which is explained in greater detail in conjunction with FIG. 4. The steps S2 through S4 are repeated until it is possible to successfully perform this synchronization step S4, which is queried in step S5—"sync success?". Only then does situation S6 occur, in which the digitized received signal is synchronized with the scanning movement of the detection laser beam—"sync". In steps S6 and S7, the received signal continues to be received—S6: "receive image data"—and evaluated—S7: "check next pattern", in order to identify synchronization marks. Based on these synchronization marks, it is then checked in step S9 whether the received signal is still synchronized with the scanning movement of the detection laser beam—"sync valid". Only when this is no longer the case does the method start from the beginning again, i.e., jumps back to step S2. Otherwise, steps S7 through S9 are continually repeated.

Figure 4:
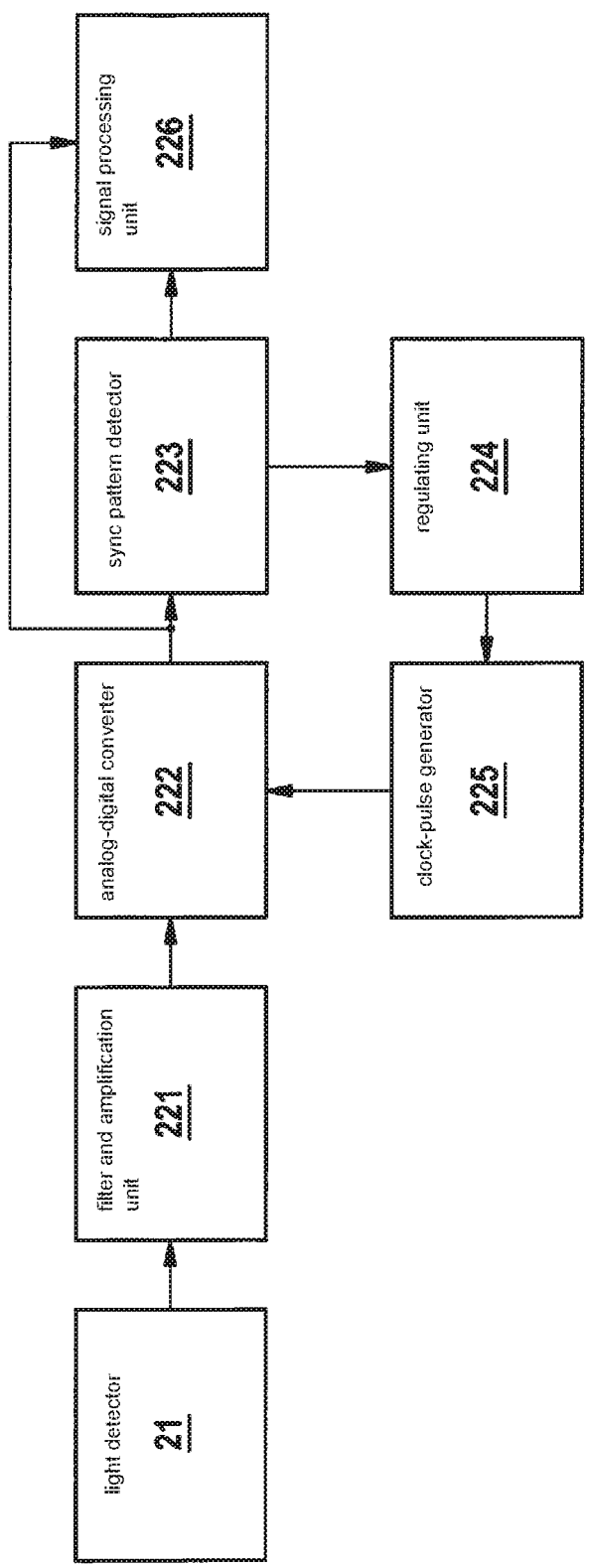
FIG. 4 schematically shows a block diagram of detection module 2 according to one specific embodiment of the present invention.

Detection module 2 depicted in FIG. 4 includes a photodiode 21 as a light detector, which converts the incident light of the detection laser beam into a photocurrent. This analog signal is initially pre-processed in a filter and amplification unit 221 before it is converted into a digital received signal by an analog-digital converter 222. The present invention aims at synchronizing this digitized received signal with the detection laser beam emitted by the scanning module and to thus correlate it with the scanning movement of the scanning module. For this purpose, the digitized received signal is evaluated with the aid of a signal processing and evaluation unit (sync pattern detector) 223, in order to identify particular signal patterns known to the detection module as synchronization marks. The synchronization marks are evaluated in order to ascertain the clock frequency of the scanning module and to determine any deviation of this clock frequency from the scanning frequency of the digitized received signal. The result of this check is fed to a regulating unit (control loop) 224 as an "error measure" which, based on this error measure, determines an actuating variable "control" for a clock-pulse generator (ADC clock control) 225, which is connected to analog-digital converter 222. In this way, the clock signal clk of the analog-digital converter is adapted to the clock frequency of the scanning module and the scanning of the received signal is thus synchronized with the respective instantaneous clock frequency of the scanning module. This adaptation is also referred to as clock recovery. The synchronization marks allow not only for a clock recovery, but also supply pieces of information about the instantaneous deflection of the detection laser beam in the scanning pattern, which is utilized for the subsequent signal evaluation of the synchronized received signal.

The synchronized received signal is also provided to an additional signal processing unit 226 (further data processing). Here, the actual function of the device according to the present invention is implemented, i.e., for example, the identification of individual visual features on a scanned surface or an interactivity function.

What is claimed is:

1. A device for implementing a detection function, comprising:
   a scanning module including at least one first laser light source configured to generate at least one detection laser beam, a deflection unit configured to deflect the at least one detection laser beam, and a control unit configured to control the at least one first laser light source and the deflection unit so that the at least one detection laser beam is moved in a predefined scanning pattern;
   a detection module including at least one light detector, the at least one light detector configured to detect light of the at least one detection laser beam reflected on an object in a beam path of the at least one laser beam, and configured to convert the detected light into a received signal, the detection module being operable at a physical distance from the scanning module; and
   an evaluation unit configured to evaluate the received signal;
   wherein the control unit is configured to control the first laser light source for the detection laser beam in such a way that the detection laser beam leaving the scanning module is modulated as a function of the detection laser beam deflection to include synchronization marks, and the evaluation unit is configured to identify the synchronization marks in the received signal and to synchronize the received signal with the deflection of the detection laser beam based on the identified synchronization marks.

2. The device as recited in claim 1, wherein the first laser light source is configured to generate the at least one detection laser beam in a non-visible wavelength range, the non-visible wavelength being in the infrared range.

3. The device as recited in claim 1, wherein the deflection unit includes a micro-mirror assembly.

4. The device as recited in claim 3, wherein the micro-mirror assembly includes a two-dimensional micro-mirror or two one-dimensional movable micro-mirrors, for implementing a line-by-line or column-by-column scanning movement of the detection laser beam.

5. The device as recited in claim 1, further comprising:
   a projection unit configured to project pieces of image information on an image surface at least in one area of the scanning pattern.

6. The device as recited in claim 1, wherein the detection laser beam generated by the first laser light source is also used for projection of pieces of image information and the first laser light source is controlled to project the pieces of image information to be projected.

7. The device as recited in claim 1, wherein the scanning module includes at least one second laser light source configured to generate at least one projection laser beam for projecting pieces of image information, the projection laser beam together with the detection laser beam being moved using the deflection unit in the predefined scanning pattern, and the at least one second laser light source being controlled as a function of the pieces of image information to be projected to generate the at least one projection laser beam.

8. The device as recited in claim 1, wherein the detection laser beam is modulated as a square wave signal having a predetermined fixed frequency.

9. The device as recited in claim 1, wherein the detection laser beam is modulated as a square wave signal having a frequency which is a function of the deflection of the detection laser beam.

10. The device as recited in claim 1, wherein the detection laser beam is modulated as at least one of: a square wave signal, or a sawtooth signal.

11. The method as recited in claim 1, wherein the detection laser beam is modulated with at least one of: a predetermined frequency, or a varying frequency.

12. A device for implementing a detection function, comprising:
- a scanning module including at least one first laser light source configured to generate at least one detection laser beam, a deflection unit configured to deflect the at least one detection laser beam, and a control unit configured to control the at least one first laser light source and the deflection unit so that the at least one detection laser beam is moved in a predefined scanning pattern;
- a detection module including at least one light detector, the at least one light detector configured to detect light of the at least one detection laser beam reflected on an object in a beam path of the at least one laser beam, and configured to convert the detected light into a received signal, the detection module being operable at a physical distance from the scanning module; and
- an evaluation unit configured to evaluate the received signal;
- wherein the control unit is configured to control the first laser light source for the detection laser beam in such a way that the detection laser beam is modulated as a function of the detection laser beam deflection and in this way is provided with synchronization marks, and the evaluation unit is configured to identify the synchronization marks in the received signal and to synchronize the received signal with the deflection of the detection laser beam based on the identified synchronization marks; and
- wherein the evaluation unit is further configured to:
  - identify objects as a detection event in the beam path of the detection laser beam based on the received signal;
  - locate the detection event in the scanning pattern based on the received signal; and
  - generate at least one predetermined detection control signal based on the identified detection event in combination with the location of the detection event in the scanning pattern.

13. The device as recited in claim 12, wherein at least one data channel configured to transmit detection control signals is provided between the detection module and the scanning module and/or a host system.

14. A method for operating a device that includes a scanning module and a detection module operable at a physical distance from the scanning module, the method comprising:

generating, using at least one first laser light source of the scanning module, at least one detection laser beam for implementing a detection function;

deflecting, using a deflection unit of the scanning module, the at least one detection laser beam so that the at least one detection laser beam is moved in a predefined scanning pattern; and detecting, using the detection module, light of the detection laser beam reflected on an object in a beam path of the at least one detection laser beam, and converting the detected light into a received signal;

wherein the at least one detection laser beam leaving the scanning module is modulated as a function of its deflection to include synchronization marks, the synchronization marks being identified in the received signal and the received signal being synchronized with the deflection of the detection laser beam based on the identified synchronization marks.

15. The method as recited in claim 14, wherein the detection laser beam is also utilized for projecting pieces of image information and the at least one laser light source is controlled to project the pieces of image information.

16. The method as recited in claim 14, wherein at least one projection laser beam is generated using the scanning module to project pieces of image information, the projection laser beam together with the detection laser beam being moved in the predefined scanning pattern and the projection laser beam being modulated in accordance with the pieces of image information to be projected.

17. The method as recited in claim 16, wherein the pieces of image information are projected sequentially in the form of pixels, in each case a predefined number of pixels forming an image line or image column, a predefined number of image lines and image columns forming a frame and a sequence of frames forming an image sequence, and the detection laser beam being modulated as a function of a piece of meta-image information, which relates to the instantaneously projected frame and/or to the instantaneously projected image line or image column and/or to the instantaneously projected pixels.

18. The method as recited in claim 17, wherein the detection laser beam is modulated in each case simultaneously with the projection of at least a part of at least one predetermined image line or image column of at least one predetermined frame of an image sequence.

19. The method as recited in claim 14, wherein the detection laser beam is modulated using a predefined signal pattern for generating the synchronization marks.

20. The method as recited in claim 14, wherein the detection laser beam is modulated as a square wave signal having a predetermined fixed frequency or having a frequency which is a function of the deflection of the detection laser beam.

* * * * *